July 4, 1939.  G. E. COX ET AL  2,164,986
PROCESS FOR THE TREATMENT OF CRUDE CALCIUM CYANAMID
Filed May 14, 1937  3 Sheets-Sheet 3
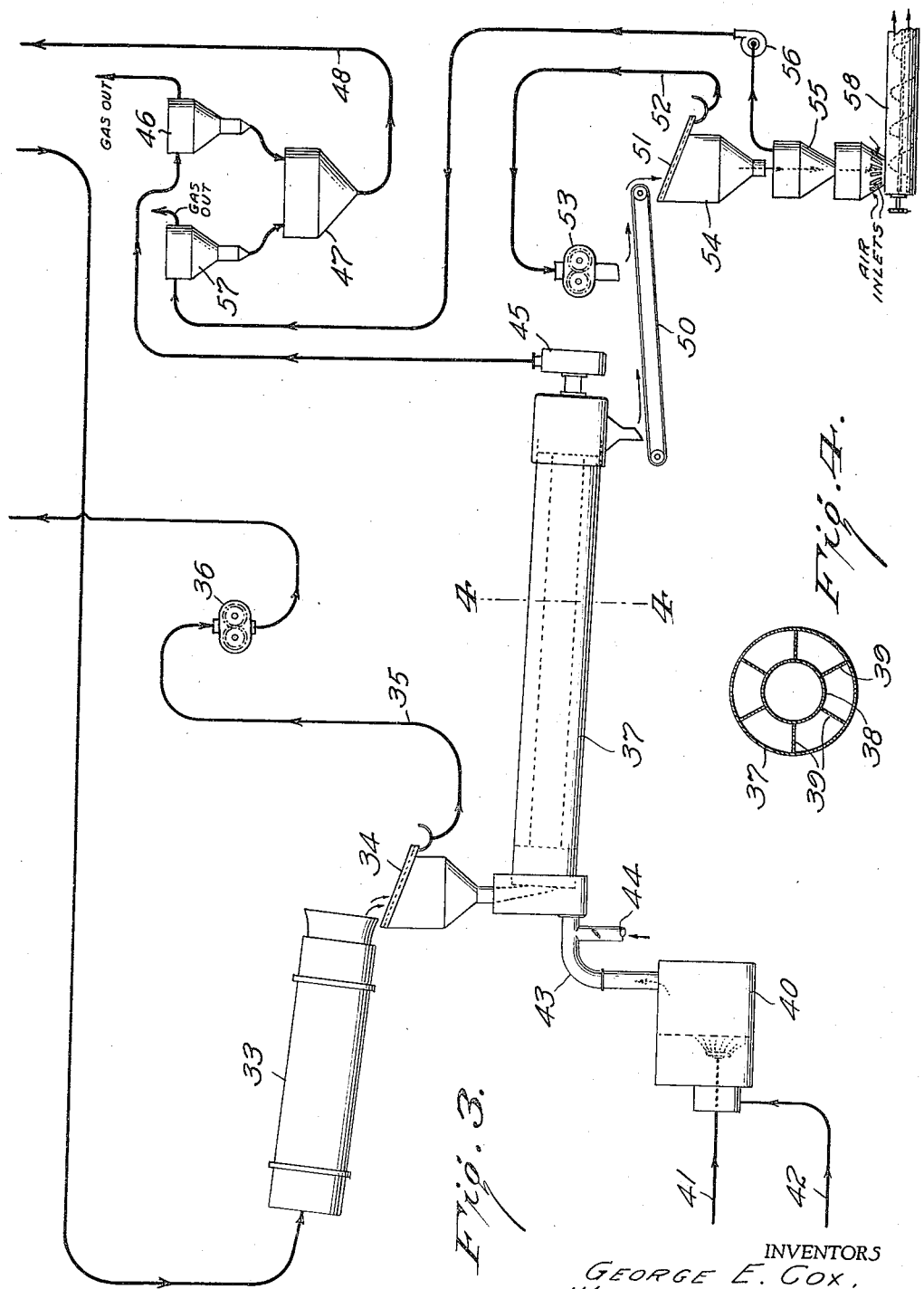
INVENTORS
GEORGE E. COX,
WALTER G. McBURNEY,
BY Ellis S. Middleton
ATTORNEY.

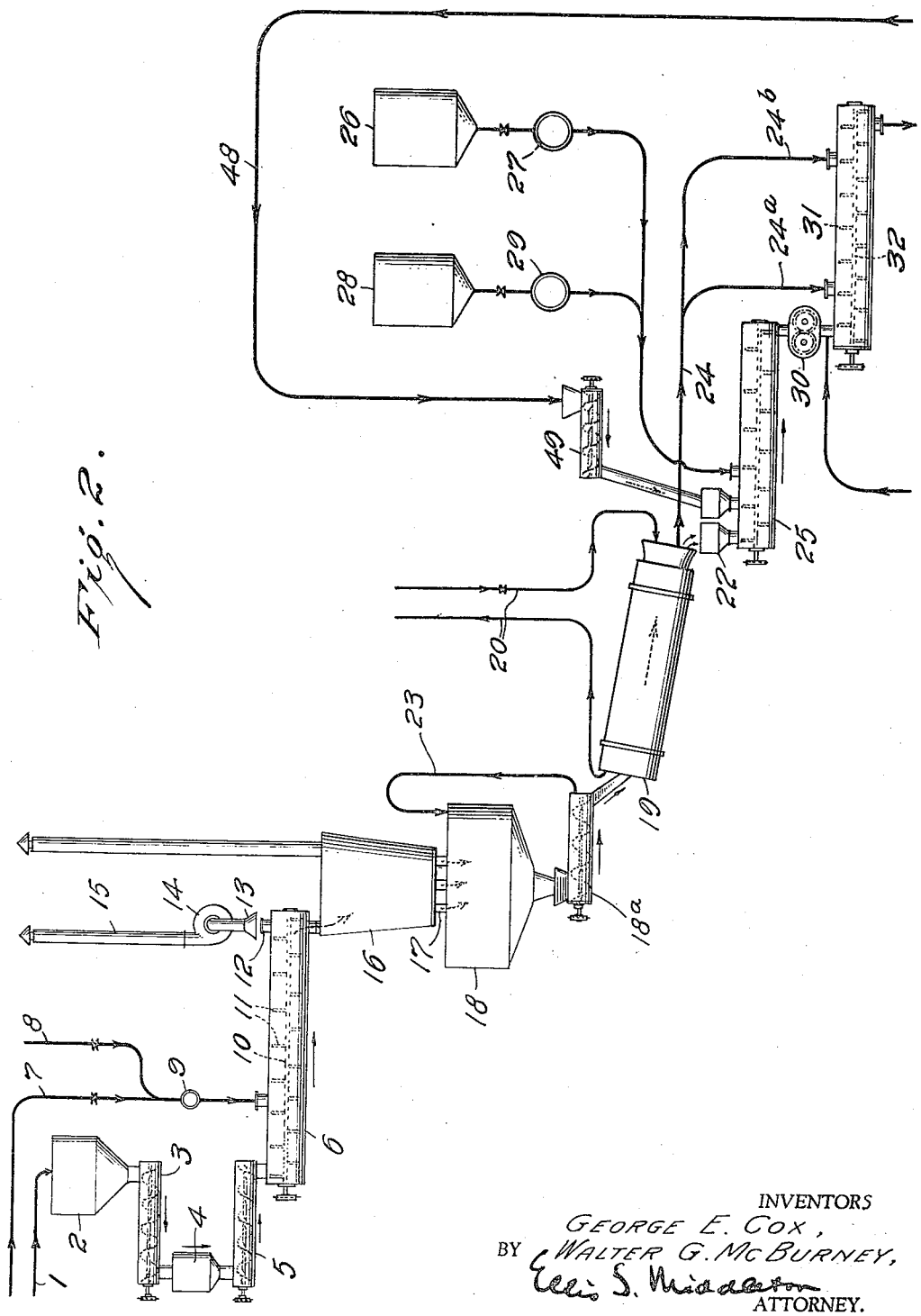

Patented July 4, 1939

2,164,986

UNITED STATES PATENT OFFICE 2,164,986

PROCESS FOR THE TREATMENT OF CRUDE CALCIUM CYANAMID

George E. Cox, Niagara Falls, N. Y., and Walter G. McBurney, Niagara Falls, Ontario, Canada, assignors to American Cyanamid Company, New York, N. Y., a corporation of Maine Application May 14, 1937, Serial No. 142,633

6 Claims. (Cl. 23—239)

The present invention relates to processes for the treatment of crude calcium cyanamid to produce granules therefrom.

Many methods heretofore for the granulation of calcium cyanamid have been known and, though from a theoretical standpoint the conversion of the non-granular material into granular form is comparatively simple, yet actually and from a practical standpoint, many difficulties exist. One of the recognized difficulties in the treatment of crude cyanamid is to satisfactorily hydrate all the free lime which occurs therein as an impurity. This is particularly important because, if it is not removed or converted into a harmless constituent, when such cyanamid is stored there is danger that the moisture present in the air will react with such carbide to produce explosive quantities of acetylene. It is imperative, therefore, that this danger be eliminated.

Another difficulty arising during the granulation of cyanamid is the formation of undesirable quantities of dicyandiamid, hereinafter referred to as dicy. The accepted standards require that the dicy thereof be kept within reasonable limits, that is, a good cyanamid fertilizer should not contain more than 2% dicy nitrogen.

The formation of dicy in the treatment of calcium cyanamid appears to be in large part the function of temperature, moisture and time. Consequently, previous practice has aimed to keep the temperature as low as possible, while the material is moist, or if higher temperatures could not be avoided, to pass the material through the high temperature stage as rapidly as possible to thus decrease the time in which moisture acted to form dicy. This has resulted in low production efficiency due to the fact that the proper treatment could not be afforded in a short space of time.

It has been discovered, however, and it is one of the principal objects of this invention, that dicy formation may be inhibited by certain substances if present in certain quantities and at certain stages of the process of granulation, even though temperatures and moisture contents are reached which, without such inhibitors, would result in an abnormally high dicy formation.

The granulation of calcium cyanamid heretofore has been accomplished by rolling or tumbling the non-granular and comparatively fine material upon itself until granules of the desired size are formed. While this method is eminently satisfactory, yet it requires a rather careful control to prevent the granules from building up suddenly, beyond the size desired. The present invention is concerned with a system of granulation which predetermines the size of the eventual granules without depending upon a mere building up of agglomerated particles into a granule.

The present invention, therefore, is concerned with methods of overcoming the above deficiencies and consists in an improved process of granulating a crude calcium cyanamid whereby maximum quantities of granules of the desired size may be produced with comparative ease, while avoiding all of the above difficulties.

The process in its entirety is diagrammatically represented in the accompanying drawings in which Fig. 1 is a flow sheet showing the general procedure;

Fig. 2 is a diagrammatic showing of a part of the apparatus used;

Fig. 3 illustrates diagrammatically the remaining portion of the apparatus; and

Fig. 4 is a sectional view along the line 4—4 of the drier of Fig. 3.

Figure 1:
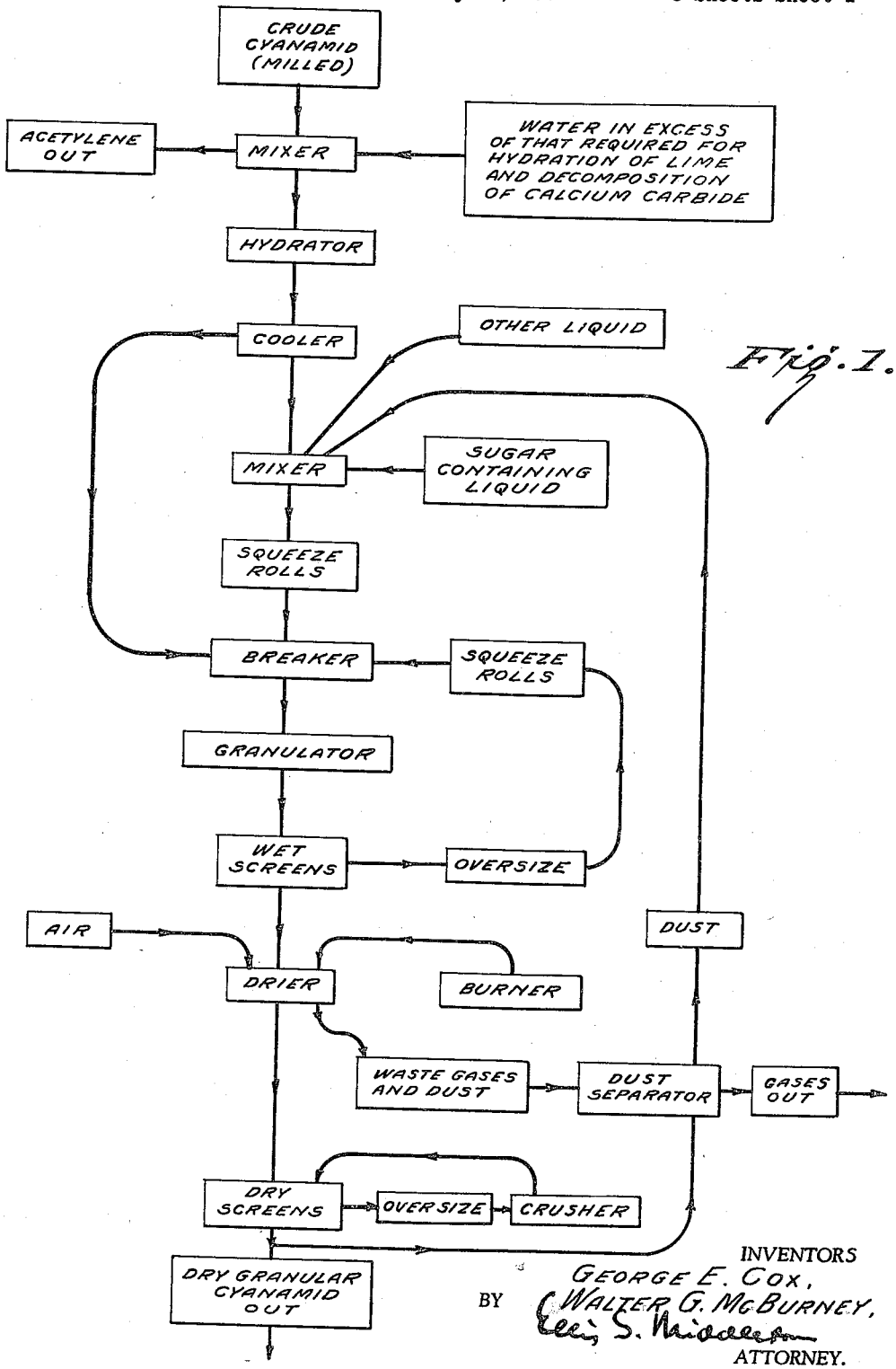

Referring now to the flow sheet and a general description without detailing the apparatus, the crude calcium cyanamid containing as impurities therein principally lime and calcium carbide, is milled in any desired manner and then mixed with water in a quantity in excess of that required to hydrate the lime and decompose the calcium carbide. The first action of this water is to decompose the carbide, the second action being to cause hydration of the free lime. As a result of the lime hydration, the temperature rises and the excess water is largely eliminated in the form of steam. The fully hydrated material is then cooled and moistened with a liquid containing a substance which has been found to have the effect of inhibiting the formation of dicy during the process. This material does not act as a binder.

The thus moistened material, after having been thoroughly mixed, is passed between squeeze rolls, which form flakes therefrom. The thickness of these flakes determines in large measure the diameter of the eventual granules.

The flakes from the squeeze rolls move to an apparatus which has the effect of breaking up the flakes into smaller fragments or rough granules. Inasmuch as the material at this point is slightly moist, in order to prevent the rough granules from sticking together, it is desirable to add at this point some of the cool, fully hydrated cyanamid from the cooling equipment.

The broken up flakes constituting the rough granules then pass to a granulator which may take the form of a rotating cylinder where the pieces are tumbled upon themselves, their corners knocked off, some of the dust or finer particles pounded thereinto, the total result being that a substantially spherical granule is turned out of this equipment. The material is discharged onto a screen, the oversize passing from the screen through squeeze rolls and back to the breaker, the major portion, however, of the granules passing through the screen and into the drier. Here the moist granules are contacted with hot burner gases, moving in a co-current direction and in this equipment the moisture content of the granules is reduced. Any dust passing out of the drier with the exhaust gases is separated and returned to the mixer, which follows the cooler. The dried granular material is discharged onto a screen, the oversize crushed so that it will pass through the screen and the dry granular cyanamid passed out of the system as a finished product.

Referring now with particular detail to Fig. 2, crude calcium cyanamid which contains, among other impurities, free lime and calcium carbide, is milled to −20 mesh so that a material containing approximately 40 to 50% of −200 mesh particles enters at 1 and is received in bin 2. This bin discharges into a feed worm 3 operating at a uniform rate which carries the material into automatic scales 4, discharging by means of feeder 5 into a mixing device 6.

At this point, water through line 7 or other liquid through line 8 and metered by device 9 is passed into the mixer 6. This mixer may consist of a cylindrical shell or long closed trough containing a rotating shaft 10 with a series of paddles 11 thereon, the purpose being to thoroughly mix and incorporate the dry cyanamid with the water or other liquid. In practice, the water added is in excess of that required for the hydration of the free lime and that required to decompose the calcium carbide, by an amount sufficient to take care of evaporation during the hydration stage where the highest temperatures are reached. Ordinarily, using cyanamid containing 24.5% nitrogen, the water requirement is approximately 9½% by weight.

The first action of the water upon the cyanamid mixture is to decompose the calcium carbide and generate acetylene. Inasmuch as mixtures of acetylene and air are violently explosive, it is imperative that air be excluded from the mixer 6. This can readily be done from the feed end by reason of the fact that the feeder 5 is maintained sufficiently full to keep the passageway between it and the mixer filled with cyanamid. The other end of the mixer 6 is provided with a discharge 12 over which is a funnel-shaped head 13 connected to a blower 14 and discharge stack 15. A suitable space exists between the discharge 12 and the head 13. Consequently, operation of the fan 14 will cause a huge volume of air to enter in the space between the parts 12 and 13 so that immediately the substantially 100% acetylene leaves the port 12, it is diluted with air to a point well below its explosive concentration. In other words, within the mixer 6 there is no air or such small quantities of air that the acetylene is well above its explosive concentration while as soon as the acetylene leaves the port 12, its concentration is reduced to a point below its explosive concentration.

The substantially calcium carbide free cyanamid, wet with water, is then discharged into the hydrator 16. This is usually of large capacity, from which the fully hydrated cyanamid is slowly but continuously being discharged from the bottom through spouts 17. Consequently, it takes a considerable length of time for the cyanamid to pass from the top to the bottom of the hydrator 16. During this passage which may take approximately 3½ hours, hydration of the contained lime takes place. This hydration causes the temperature to rise from approximately 95° C. to as high as 140° C., the steam generated as a result of this high temperature being discharged through the stack. Of course, sufficient water must be introduced through the line 7 to take care of this temperature rise in the hydrator as otherwise an insufficient quantity of water would be provided for the lime hydration. Also, due to the lime hydration and the other side reactions which take place there, the material has a tendency to expand and dry. Consequently, as discharged through the port 17, it is much finer than when it entered the hydrator 16. A screen analysis indicates approximately 70% of −200 mesh. From the port 17, the fully hydrated cyanamid is discharged into a storage hopper 18.

Inasmuch as it has been shown that cyanamid at a temperature between 40 and 70° C. facilitates granulation, the material from the hopper 18 which is well over 100° C. is then passed to a cooler 19 by way of a variable speed volume feeder. This cooler may take the form of an inclined rotating cylinder either cooled exteriorly by air or interiorly by water cooled pipes 20. Best results are obtained when the hydrated cyanamid is cooled to a temperature as low as 70° C.

The cooled material is received from a variable speed volume feeder 21, the feed from the bin 18 being regulated to allow a sufficient excess of material in the circulating system to be sure that there is always sufficient to keep automatic scales 22 supplied, as well as to provide an excess of the cooled hydrated cyanamid for control purposes in the breaker, as will be more fully hereinafter described. For this reason, a line 23 is provided to return some of the cooled material from the feeder 21 to the bin 18 as well as a line 24 branching into lines 24a and 24b to the breaker.

Automatic scales 22 are set to feed a definite amount per hour of hydrated cyanamid to the mixer 25. In this equipment, the cyanamid is mixed with a liquid which preferably contains a dicy inhibitor. This liquid may be fed from tank 26 provided with a meter 27.

It has been found that sugar or sugary materials are particularly effective in inhibiting excessive formation of dicy during the granule forming and drying stages at which latter point the highest temperatures are reached. While any sugar and most sugar-like substances may be used, such as sucrose, fructose, invert sugar, arabinose, glucose, sulfite liquors and the like, yet perhaps the cheapest and most satisfactory material is black strap molasses. For the purpose, a dilute solution of black strap molasses in water is all that is required, the molasses being present in the solution in the proportion of from $\tfrac{1}{10}$ of 1% to as high as ½ of 1%. The total quantity of molasses solution used may be from 20 to 35% of the weight of the material treated on a dry basis, the optimum quantity being substantially 27%.

It has been found that the effect of black strap molasses is not only to inhibit the excessive formation of dicy, but it also tends to prevent the cyanamid and water from setting into a hard mass. It also reduces the amount of nitrogen lost as ammonia in the drier.

If too much molasses is used, the eventual granules are very soft due to the low dicy content. Inasmuch as the dicy content of the final granules is responsible in large measure for their hardness, the use of an excessive quantity of molasses is undesirable. If the dicy nitrogen content of the final granules is approximately 1½%, they are of desirable hardness and stability and this content of dicy nitrogen is not too high.

Where an actual binding effect is desired in the granulating procedure, some liquid binder or solution of a binder may be introduced from the tank 28 metered as at 29 although this will ordinarily not be necessary. Calcium nitrate has been found to be eminently satisfactory where an actual binder is desired.

The requisite amount of cooled hydrated cyanamid and sugar solution having been introduced into the mixer 25, these substances are thoroughly mixed and then passed to a set of squeeze rolls 30. The faces of these rolls are ground smooth and are ordinarily set to a clearance of about thirty-two thousandths of an inch. One roll is fixed and the other held in place by means of springs in the usual manner to prevent breakage in the event of the presence of some actually hard substance. The spacing apart of the faces of these rolls will determine the thickness of the flake to be made at this point and, consequently, will substantially determine the diameter of the eventual granule.

The material in passing through the rolls is flaked and by means of the usual doctor blades on the underside of such rolls, drops into a breaker. This is a piece of apparatus furnished with knives 31 attached to a rotating shaft 32 which serve to break or cut up the flake into smaller pieces roughly granular in form. Inasmuch as this material is somewhat moist with some excess moisture at the surface due to passage through the squeeze rolls, the dry finely powdered fully hydrated cyanamid introduced through the lines 24a and 24b serve to absorb this excess moisture and prevent the sticking together of the rough granular particles. From the breaker, the rough granules then pass to a granulating apparatus 33 which takes the form of an inclined rotating cylinder. In this cylinder, the rough granules are tumbled upon themselves, and rounded up into the eventually sized granules. In other words, in this piece of equipment the corners and rough edges of the rough granules are knocked off and the finer particles pounded into the larger particles, with the result that a certain amount of compacting and rounding up takes place therein. The substantially rounded granules are then discharged onto a wet screen 34, the oversized particles which are unable to pass through the screen moving by means of conveyor 35 to a pair of squeeze rolls 36. These rolls have the effect of producing substantially flake shape particles which are then returned to the breaker 32 where they again enter the cycle.

The material passing through the screen then goes to a rotary drier 37. This drier takes the form of an inclined rotating cylinder with an inner concentrically arranged cylinder 38 with radial blades 39 therebetween, thus dividing the drier into a series of smaller compartments. A burner 40 supplied with fuel from the line 41 and air through line 42 discharges its combustion products through the flue 43 into the drier 37, the combustion products passing concurrently with the granules to be dried. An additional regulated quantity of cool air may be supplied through the duct 44 to reduce the temperature of the combustion gases where desired.

By arranging the drier 37 into a series of smaller compartments, an increased heating effect is produced due to radiation and reflection, while at the same time the distance through which the granules being dried are dropped is reduced. This, therefore, reduces the danger of fracture of the granules while they are in a weak or friable state.

The rate of rotation of the drier, the angle of inclination and the temperature of the combustion gases are so regulated that the free moisture content of the final discharged granules shall be not over 1%.

It has been found that the presence of a sugar or sugary material during the granule forming and drying periods prevents the excessive formation of dicy. A certain amount of dicy formation is desirable in that it contributes to the hardness of the granule as above set forth. The fact that the combustion gases contain substantial quantities of carbon dioxide leads to the formation of calcium carbonate in the granules which also contributes to their hardness.

The combustion gases with any entrained dust are discharged through fan 45 into a centrifugal dust arrestor 46, the dust dropping into bin 47 and conveyed by means of line 48 to the feeder 49 where it finds its way back into the mixer 25 immediately preceding the squeeze rolls 30.

The finely dried granules are discharged onto conveyor 50 and pass to dry screen 51. Any oversize passes by means of conveyor 52 to a pair of crushing rolls 53 which also discharges onto belt 50. The material initially passing through screen 51 and also the crushed oversize then moves into hopper 54 and then to a battery of dedusters 55 in a curtain through which air is drawn by means of fan 56. Any dust is removed with this air and passes through a centrifugal dust separator 57 which discharges into hopper 47. The finally dried granules free from dust then pass to feeder 58 and to the usual packaging device for storage. The finished product may, by following the above procedure, contain granules better than 90% of which are between 10 and 48 mesh, and substantially free from dust.

We claim:

1. A method of granulating calcium cyanamid which includes the step of adding a sugar containing liquid to fully hydrated non-granular cyanamid, the amount of sugar being insufficient to act as a binder, the amount of liquid being sufficient to moisten the cyanamid, and passing the moistened material through squeeze rolls to form a flake, breaking up the flake into rough granules, tumbling the rough granules upon themselves to round up the same, and drying the rounded granules.

2. The method of claim 1 in which the sugar content of the liquid is from one tenth of one percent to one half of one percent.

3. The method of claim 1 in which the sugar containing liquid is diluted black strap molasses.

4. The method of claim 1 in which the sugar containing liquid is diluted black strap molasses, the quantity of such liquid used being from 20 to 35% of the weight of the cyanamid treated, on a dry basis.

5. A method of granulating crude calcium cyanamid which includes the following steps: milling the crude material to reduce its size, thoroughly mixing the milled material with water in excess of that amount required for hydration of the lime and decomposition of the calcium carbide, permitting the lime in the cyanamid to hydrate, cooling the fully hydrated material, adding to the cooled material a liquid to moisten the same, passing the moist material through squeeze rolls to form flakes, breaking up the flakes into rough granules, adding to said granules a quantity of hydrated cyanamid which has been by-passed around the squeeze rolls, tumbling the mass upon itself to form rounded granules, drying the thus rounded granules, separating the dried granules from their accompanying dust and returning the dust to the second liquid addition stage.

6. The method of claim 5 in which the liquid added after the cooling stage is a sugar containing liquid, the sugar being present in an amount insufficient to act as a binder.

GEORGE E. COX.
WALTER G. McBURNEY.